US008838551B2

(12) United States Patent
Fanghaenel et al.

(10) Patent No.: US 8,838,551 B2
(45) Date of Patent: Sep. 16, 2014

(54) MULTI-LEVEL DATABASE COMPRESSION

(75) Inventors: Thomas Fanghaenel, San Jose, CA (US); Uttam Jain, San Jose, CA (US); Quanzhong Li, San Jose, CA (US); Guy M. Lohman, San Jose, CA (US); Richard S. Sidle, Mountain View, CA (US); Ioana R. Stanoi, San Jose, CA (US); Robbert Van der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/278,330

(22) Filed: Oct. 21, 2011

(65) Prior Publication Data

US 2013/0103655 A1 Apr. 25, 2013

(51) Int. Cl.
*G06F 17/30* (2006.01)

(52) U.S. Cl.
CPC ............................... *G06F 17/30336* (2013.01)
USPC ........................................................ 707/693

(58) Field of Classification Search
CPC .................... G06F 17/30153; G06F 111/1453; G06F 2212/401
USPC ........................................................ 707/693
See application file for complete search history.

(56) References Cited

U.S. PATENT DOCUMENTS

| | | | |
|---|---|---|---|
| 5,561,421 A | 10/1996 | Smith et al. | |
| 5,794,228 A | 8/1998 | French et al. | |
| 6,226,411 B1 | 5/2001 | Hiyoshi | |
| 7,283,072 B1 | 10/2007 | Plachta et al. | |
| 7,460,033 B2 | 12/2008 | Iyer et al. | |
| 2006/0069857 A1* | 3/2006 | Lekatsas et al. | 711/108 |
| 2007/0229323 A1 | 10/2007 | Plachta et al. | |
| 2008/0235306 A1 | 9/2008 | Kim et al. | |
| 2008/0294863 A1* | 11/2008 | Faerber et al. | 711/170 |
| 2009/0144221 A1 | 6/2009 | Berk et al. | |
| 2010/0125553 A1* | 5/2010 | Huang et al. | 707/661 |
| 2010/0169274 A1 | 7/2010 | Kulkarni et al. | |
| 2010/0312800 A1* | 12/2010 | Lumb | 707/796 |
| 2010/0318759 A1* | 12/2010 | Hamilton et al. | 711/171 |
| 2012/0166401 A1* | 6/2012 | Li et al. | 707/692 |

OTHER PUBLICATIONS

Hodak, B., Advanced Compression in Oracle Database—Oracle Open World, Nov. 2007.
Strahl, S. et al., An Efficient Fine-Grain Scalable Compression Scheme for Sparse Data, 2004-2005.
Bai, Lan S. et al., Adaptive Filesystem Compression for Embedded Systems, 2001-2002.

(Continued)

*Primary Examiner* — Rehana Perveen
*Assistant Examiner* — Alexander Khong
(74) *Attorney, Agent, or Firm* — Lieberman & Brandsdorfer, LLC

(57) ABSTRACT

Embodiments of the invention relate to a multi-level database compression technique to compress table data objects stored in pages. A compact dictionary structure is encoded that represents frequent values of data at any level of granularity. More than one level of compression is provided, wherein input to a finer level of granularity is an output of a coarser level of granularity. Based upon the encoded dictionary structure, a compression technique is applied to a stored page to compress each row on the page. Similarly, a de-compression technique may be applied to decompress the compressed data, utilizing the same dictionary structures at each level of granularity.

20 Claims, 12 Drawing Sheets

(56) References Cited

OTHER PUBLICATIONS

Chen et al., Query Optimization in Compressed Database Systems, Proceedings of the 2001 ACM SIGMOD International Conference on Management of Data, pp. 271-282, 2001.

Ilyas et al., CORDS: Automatic Discovery of Correlations and Soft Functional Dependencies, Proceedings of the 2004 ACM SIGMOD International Conference on Management of Data, 2004.

Ziv et al., A Universal Algorithm for Sequential Data Compression, IEEE Transactions on Information Theory 23(3), pp. 337-343, 1977.

* cited by examiner

| Hash Cluster | Cluster Size | Patterns in Cluster |
|---|---|---|
| C0 | 1 | P1 |
| C2 | 2 | P2, P3 |
| C4 | 3 | P4, P5, P6 |
| C9 | 1 | P7 |
| C16 | 1 | P8 |

FIG. 2

MULTI-LEVEL DATABASE COMPRESSION

BACKGROUND

The invention relates to multi-level database compression. More specifically, the invention relates to data compression at multiple levels of granularity, including building a first dictionary at a first level and nesting the first dictionary with a second dictionary at a finer level of granularity to compress and decompress data while respecting row boundaries.

Compression techniques are important to reduce consumption of resources, such as disk space and network bandwidth. Applying compression techniques in a database system for improving disk space savings and query performance are limited. With respect to database compression, techniques are generally applied to one level of granularity of database objects, e.g. table, row, column, page, etc. However, these current compression techniques that address the granularity do not employ a nesting of multiple levels of compression.

BRIEF SUMMARY

This invention comprises a method, system, and article for multi-level compression, and specifically for constructing a dictionary and employing a single dictionary to both compress and de-compress source data for just the data being accessed (e.g., a row).

In one aspect of the invention, a method is provided for compressing data within a file. Frequent data values in a file are identified, and a first data structure is constructed to both organize and store the identified frequent values. Using the first data structure for encoding data within the file, the file is compressed. In addition, the file is divided into segments, and for each segment, frequent values of compressed data within the compressed file are identified. A second data structure is constructed to organize and store the identified frequent values of compressed data in each segment. The segments are then individually compressed using the second data structure.

In another aspect of the invention, a computer implemented method is provided for compressing data within a file. Frequent data patterns are identified in a set of source data, and a compression dictionary is constructed to both organize and store the identified frequent patterns in the source data. The construction of the compression dictionary includes: sequentially storing each identified pattern in a storage block, recording the offset and length data for each stored pattern in a pattern offset table, forming hash clusters having one or more patterns with a matching hash code, placing the patterns within each hash cluster in an order based upon criteria, and constructing a hash table which has an entry for each hash cluster. Once the construction of the compression dictionary is completed, the source data is compressed by use of the constructed compression dictionary. More specifically, an initial quantity of bytes in an input pattern of the source data is hashed. The constructed hash table is used to index into a first entry in the hash cluster. Either the symbol for the longest matching pattern in the hash cluster, if found, or an escape code of a length of an escaped sequence, if not found, is returned.

In yet another aspect of the invention, a computer program product is provided for use with compression of data. The computer program product includes a computer-readable storage medium having computer-readable program code. When the code is executed, the computer identifies frequent data patterns in a set of source data and constructs a compression dictionary to organize and store the identified frequent data patterns. More specifically, the construction of the compression dictionary includes: sequentially storing each identified pattern in a pattern storage block, recording offset and length data for each stored pattern in a pattern offset table, forming hash clusters comprised of one or more patterns with a matching hash code, placing the patterns within each hash cluster in an order based upon criteria, and constructing a hash table which has an entry for each hash cluster. Once the construction of the compression dictionary is complete, code is provided to compress the source data using the compression dictionary. More specifically, the aspect of compression includes: hashing an initial quantity of bytes of an input pattern of the source data, and employing the constructed hash table to index into a first entry in the hash cluster. A dictionary symbol for the longest matching pattern in the hash cluster, or an escape code for a length of an escaped sequence, is returned.

In yet a further aspect of the invention, a computer system is provided with a storage component that includes source data, and a functional unit in communication with the storage component. More specifically, the functional unit is provided to identify frequent data patterns in a set of source data, and to construct a compression dictionary to organize and store the identified frequent patterns in the source data. The functional unit includes tools in the form of a pattern manager. A hash table is provided to support the compression dictionary construction, and tools in the form of a compression manager and a hash manager are provided to compress source data by using the compression dictionary. The pattern manager sequentially stores each identified pattern of source data in a pattern storage block, which includes recording offset and length data for each stored pattern in a pattern offset table. In addition, the pattern manager forms hash clusters comprised of one or more patterns with a matching hash code, places the patterns of each hash cluster in an order based upon criteria, and constructs a hash table which has an entry for each hash cluster. The compression manager functions to compress the source data by using the compression dictionary. The hash manager, which is in communication with the compression manager, hashes an initial quantity of bytes of an input pattern of the source data, and uses the constructed hash table to index into a first entry in the hash cluster a group of patterns having similar prefixes. To complete the compression, the hash manager returns a symbol either for the longest matching pattern in the hash cluster, if found, or an escape code for a length of an escaped sequence, if not found.

Other features and advantages of this invention will become apparent from the following detailed description of the presently preferred embodiments of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention and not all embodiments of the invention unless otherwise explicitly indicated. Implications to the contrary are otherwise not to be made.

FIG. 2 is a block diagram showing the relationship between a hash cluster and associated patterns, for the example page dictionary structure of FIG. 1.

DETAILED DESCRIPTION

Figure 1:
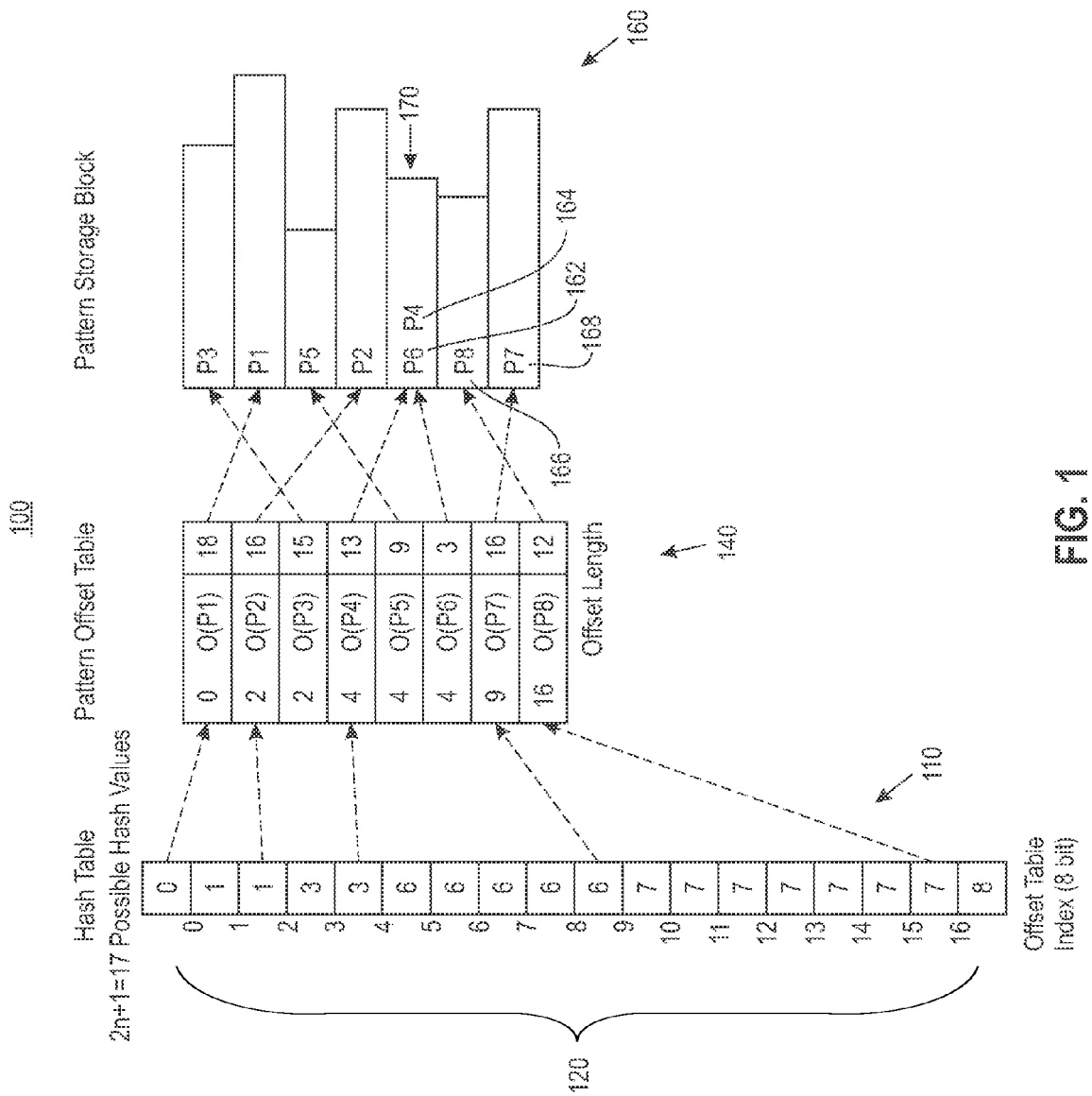
FIG. 1 is a block diagram illustrating the three components of the compact page dictionary, including a hash table, a pattern offset table, and a pattern storage block for an example of a set of patterns.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools in the form of managers. A functional unit may be implemented in programmable hardware devices such as field programmable gate arrays, programmable array logic, programmable logic devices, and the like. The functional unit may also be implemented in software for processing by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the manager and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations (e.g., over different storage devices), and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of one or more managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Databases, and use thereof, are not static. Specifically, it is known in the art that items may be manipulated in a database by insertion, removal, re-organization, etc. A database is an element to organize and store data that is in a frequent state of change. A table in a database management system is stored in a set of pages, where each page may contain a set of rows. In order to access individual rows from a page that has been compressed, it is advantageous to be able to de-compress any individual row without having to de-compress all rows on the page or all pages in the table. Similarly, if the row is modified, it is advantageous to be able to compress just that row without having to re-compress all rows on that page, or all pages in the entire table. Unlike commonly-used file compression methods that compress large blocks of data without dictionaries, such as those based on streams, using dictionaries to encode portions of rows permits de-compression or re-compression to respect row boundaries, i.e., to be limited to just one row of the table. During compression, dictionaries map a pattern in the source data to a dictionary symbol that is usually much shorter, and during decompression, map the dictionary symbol to its original source data. The number of such mappings in any dictionary is limited by the number of bits used to represent each dictionary symbol. For example, an 8-bit dictionary symbol can represent at most 256 (2 to the power 8) distinct patterns, so the dictionary would be limited to 256 entries. Similarly, a 12-bit (3 half-byte) dictionary symbol can represent at most 4096 (2 to the power of 12) distinct patterns, so the dictionary could contain up to 4096 entries.

One schooled in the art will recognize that such dictionaries can be constructed for an entire table, for all values of a column in that table, for a page, or for any other subset of the table. Dictionaries for different granularities of the table have advantages and disadvantages. A dictionary for an entire table efficiently encodes patterns in the source data that occur frequently throughout the table. However, for encoding symbols of a certain fixed length, a single dictionary for the entire table is limited in the total number of patterns it can represent throughout the table, and modifying that dictionary requires a time-consuming re-compression of the entire table using that modified dictionary. Dictionaries for each page, on the other hand, encode patterns in the source data that are common only on that page. Page dictionaries can therefore collectively represent more patterns in the table, but for a pattern that occurs often in multiple pages, might redundantly create an entry for that pattern in the dictionaries of multiple pages, and all those page dictionaries consume more space than just a single dictionary for the table. On the other hand, modifying the dictionary and re-compressing the data of a single page is much less time-consuming than modifying the dictionary and re-compressing the data of an entire table. Accordingly, the invention herein pertains to multiple levels of granularity of dictionaries in a nested hierarchy of dictionaries.

More specifically, the present invention encodes data using a table-level dictionary, and then re-compresses the resulting output symbols using page-level dictionaries constructed for each page of the table. Patterns that occur frequently throughout the table are efficiently encoded using a single entry in the table-level dictionary, and patterns that are more local to a page, or were not encoded by the table-level dictionary for any reason (e.g., due to space limitations or updates), have a "second chance" to be efficiently encoded via the page-level dictionary. During data loading, table re-organization, and batch inserts into the table, there is an opportunity to buffer inserted rows and therefore to amortize the cost of creating a page dictionary. More specifically, these buffered rows can be utilized as a unit and a page dictionary can be built based upon the rows in the buffer, and then placed on the same page following compression of the page.

Dictionary building is the process of identifying common patterns in a set of source data, and using those patterns in a data structure, referred to herein as a dictionary. The dictionary implements a mapping from a pattern to a corresponding symbol, and vice versa, through encoding and decoding, respectively. In one embodiment, the size of a symbol in a dictionary is 8 bits, which ensures that the coding scheme is byte aligned. With the symbol size of 8 bits, 256 symbols can be represented. Similarly, in one embodiment, 16 symbols are reserved in the range of 240 to 255 as escape symbols for different lengths of escaped sequences. In one embodiment, one of these 16 symbols can be reserved to represent the special partial-match code, which is always followed by the symbol of and the length of its corresponding pattern that is partially matched. The remaining 240 symbols are used to represent actual frequent patterns contained in the dictionary.

A page in a database has limited space. Therefore, it is particularly important that the dictionary for a page should be compact, while supporting efficient compression and de-compression. In one embodiment, the same compact dictionary may be employed for both the compression dictionary and a related decompression dictionary, saving space, and will hereafter be referred to herein simply as the dictionary. FIG. 1 is a block diagram (100) illustrating three components of the dictionary, including a hash table (110), a pattern offset table (140), and a pattern storage block (160). The hash table (110), also referred to herein as the dictionary hash table, is an array of 8-bit values that enables fast access to the desired hash cluster in the pattern offset table during row compression. In one embodiment, the size of the hash table for a dictionary with n slots is 2n+2 bytes. The hash table is used to look up the start and length of a hash cluster in the pattern offset table, and each look-up requires access to two consecutive bytes of this structure. The pattern offset table (140) is an array of up to 240 3-byte values, each of which represents a pattern descriptor. The pattern descriptor is a 3-byte value that is stored in the pattern offset table. Each pattern descriptor represents one symbol in the dictionary, and provides access to the associated byte pattern. A pattern descriptor contains a 16-bit value representing the start of the associated byte pattern in the pattern storage block (160), and an 8-bit value representing the length of the byte pattern. The pattern descriptors contained in the pattern offset table are grouped in hash clusters, each of which contains all the patterns whose first three bytes hash to the same 8-bit value. These hash clusters are randomly accessible via the hash table. The index of a pattern descriptor in the pattern offset table determines its symbol. The pattern storage block (160) contains all the byte patterns to which the dictionary assigns symbols.

The half-byte pattern, as referenced above, is an expanded version of a dictionary symbol. It contains the actual representation of the value associated with a pattern descriptor in the pattern offset table, i.e. the expanded representation of a dictionary symbol. All half-byte patterns that are stored in the pattern storage block start at full byte boundaries, even though they may have to be copied to locations starting at half-byte boundaries during expansion, or compared to patterns found at half-byte boundaries during compression.

The characters of the patterns of a dictionary are stored sequentially in the pattern storage block (160). The pattern offset table (140) indexes each pattern by recording the offset and length information for each stored pattern. A prefix pattern is a pattern that is a prefix of another recorded pattern; the prefix pattern is used both for the process of pattern detection and the page dictionary structure. In one embodiment, if a smaller pattern is a prefix or sub-sequence of a longer pattern, i.e. a prefix pattern, the smaller pattern is not stored redundantly. More specifically, an offset is used to point inside of the longer pattern, thereby enabling the patterns to share the same storage space in the pattern storage block (160). As shown in the example in FIG. 1, two patterns may be stored together with P6 (162) as a prefix of P4 (164), where P4 (164) is entered in the pattern storage block (160) before P6 (162) and P4 (164) is longer than P6 (162); P6 (162) is later discovered as a prefix to the P4 (164) pattern. Similarly, the length of the pattern is not indicated as a raw value, but is graphically represented in the pattern storage block (160). For example pattern P8 (166) is graphically shorter than pattern P7 (168). Accordingly, the pattern storage block (160) stores patterns of a page dictionary.

The pattern offset table (140) is an array of pattern descriptors, each of which is associated with a single dictionary entry. In one embodiment, each pattern descriptor is a 3-byte structure that contains the start offset and length of the pattern that the dictionary entry represents. However, the invention should not be limited to a 3-byte structure. The actual size of a pattern descriptor may vary during implementation. Two bytes are used for the start offset of the pattern relative to the beginning of the pattern storage block. One byte is used to indicate the pattern length in bytes. In one embodiment, each pattern contained in the dictionary is at least three bytes long, and can be up to 256 bytes in length.

The hash table (110) is used for compression to efficiently locate a pattern in the dictionary without searching. During compression only the first three bytes of an input pattern are hashed. The generated hash code (120) is used as an index to access the hash table (110). A group of patterns with the same hash code (120) are referred to as a hash cluster. Each entry in the hash table contains the symbol for the first entry of its corresponding hash cluster in the pattern offset table. The hash table is constructed so that the difference between that symbol and the symbol in the next hash-table entry gives the number of patterns in that hash cluster. For example, in FIG. 1, hash code 4, shown to the left (120) of the hash table, has value 3 in the fourth entry of the hash table (using 0-indexing), and the next entry has value 6, so the hash cluster corresponding to hash code 4 has 6−3=3 entries in the pattern offset table, starting at entry 3. If that difference is zero, then there are no patterns in the pattern offset table for that hash code. For example, in FIG. 1, hash code 15 has value 7 in the fifteenth entry, and the next entry is also 7, meaning that there are no entries in the pattern offset table for the hash cluster corresponding to hash code 15. FIG. 2 is a block diagram (200) showing the relationship between each hash cluster and its associated pattern(s) for the dictionary example of FIG. 1. As shown in this example, there are five hash clusters (210), (212), (214), (216), and (218). Each hash cluster has an associated cluster size (220), which references the quantity of patterns in the cluster, but this need not be stored explicitly in the dictionary, since it can be derived from the hash table, as described above. More specifically, the first hash cluster (210) has a cluster size of one (230) and references one cluster pattern, e.g. P1; the second hash cluster (212) has a cluster size of two (232) and references two cluster patterns, e.g. P2 and P3; the third hash cluster (214) has a cluster size of three (234) and references three cluster patterns, e.g. P4, P5, and P6; the fourth hash cluster (216) has a cluster size of one (236) and references one cluster pattern, e.g. P7; and the fifth hash cluster (218) has a cluster size of one (238) and references one cluster pattern, e.g. P8. Accordingly, as shown herein a group of patterns with the same hash code are identified as a hash cluster and organized in a data structure.

As will be described below in detail, all patterns in the pattern offset table are sorted first by hash codes and then by pattern lengths. Symbol values are assigned in a continuous manner to symbols via the pattern offset table. The content of a cluster's hash entry in the hash table is the smallest symbol value of the hash cluster, which in one embodiment is the index to the pattern offset table.

Figure 3:
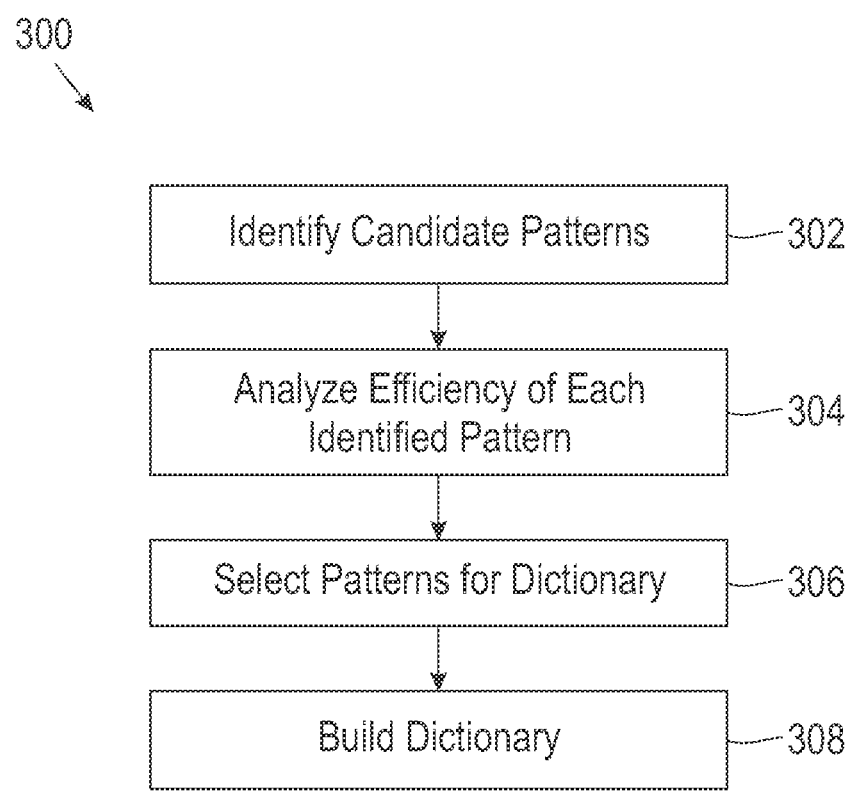
FIG. 3 is a flow chart illustrating a process for construction of the page dictionary.
Figure 4:
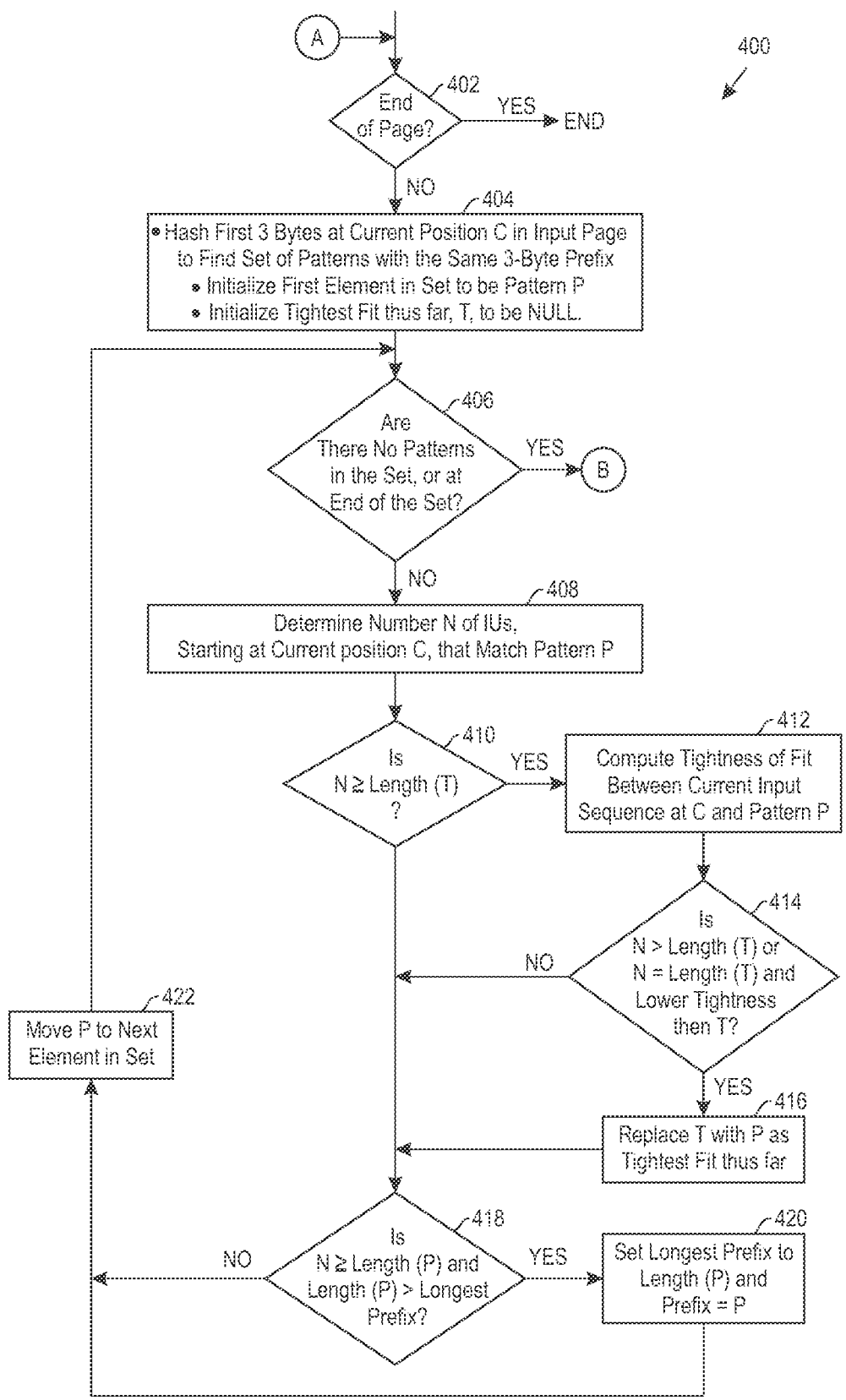
FIG. 4 is a flow chart illustrating a process of searching for patterns for inclusion in the page dictionary.
Figure 4:
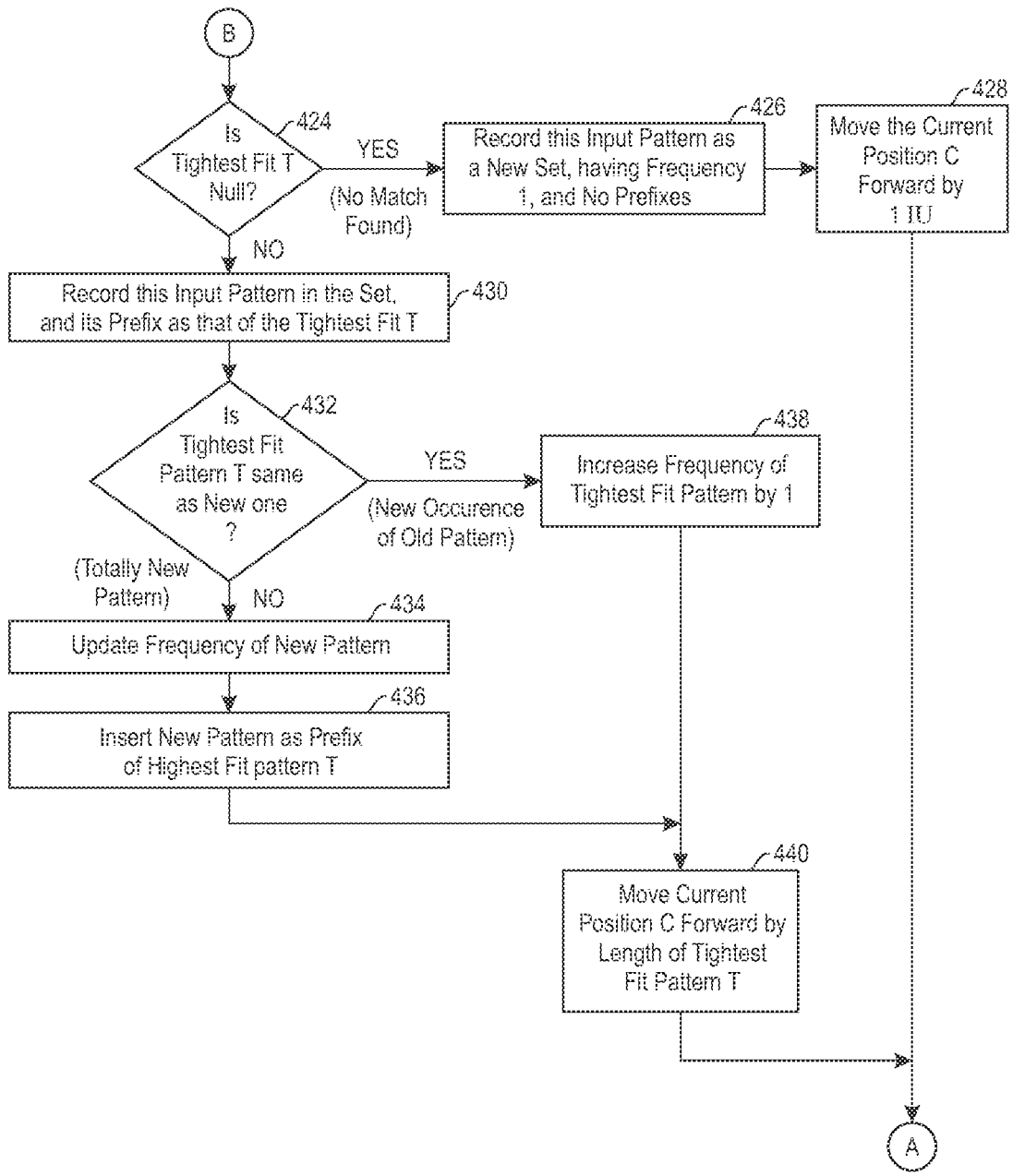
Figure 5:
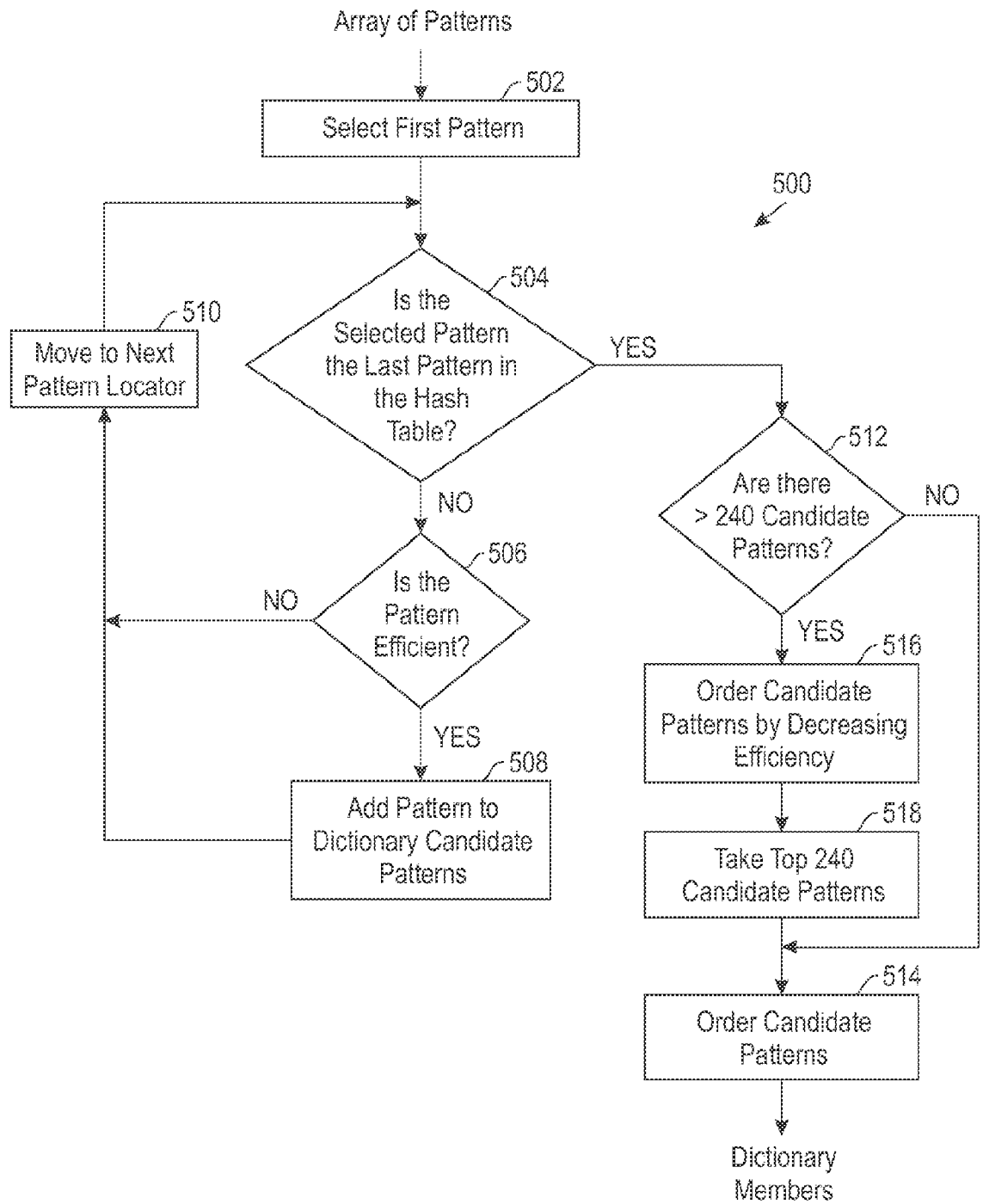
FIG. 5 is a flow chart illustrating a process for analyzing efficiency, and based upon this analysis a selection of members for the compression dictionary.
Figure 6:
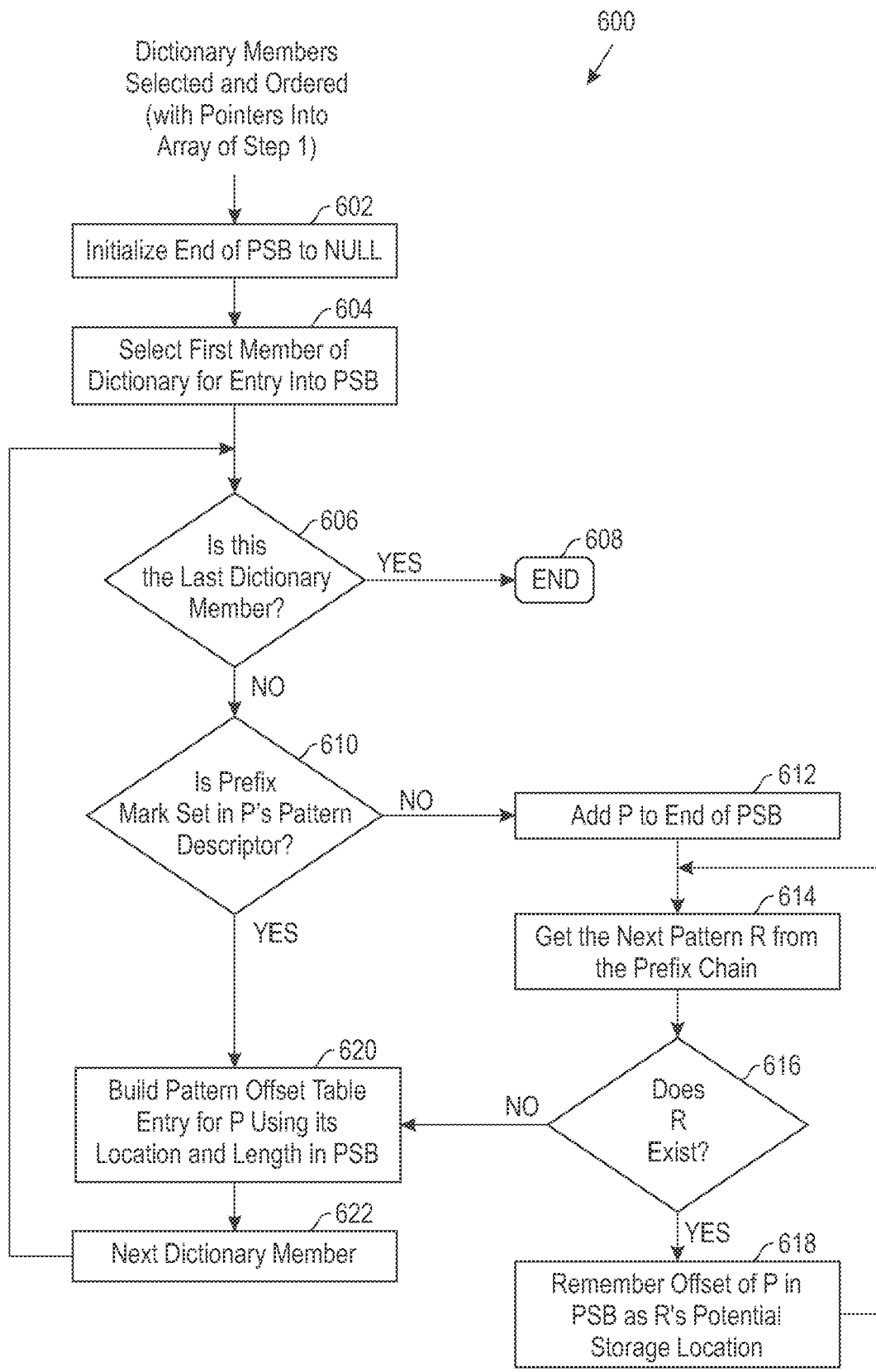
FIG. 6 is a flow chart illustrating a process for building the pattern storage block, including generating pattern descriptors for all of the dictionary member patterns.
Figure 7:
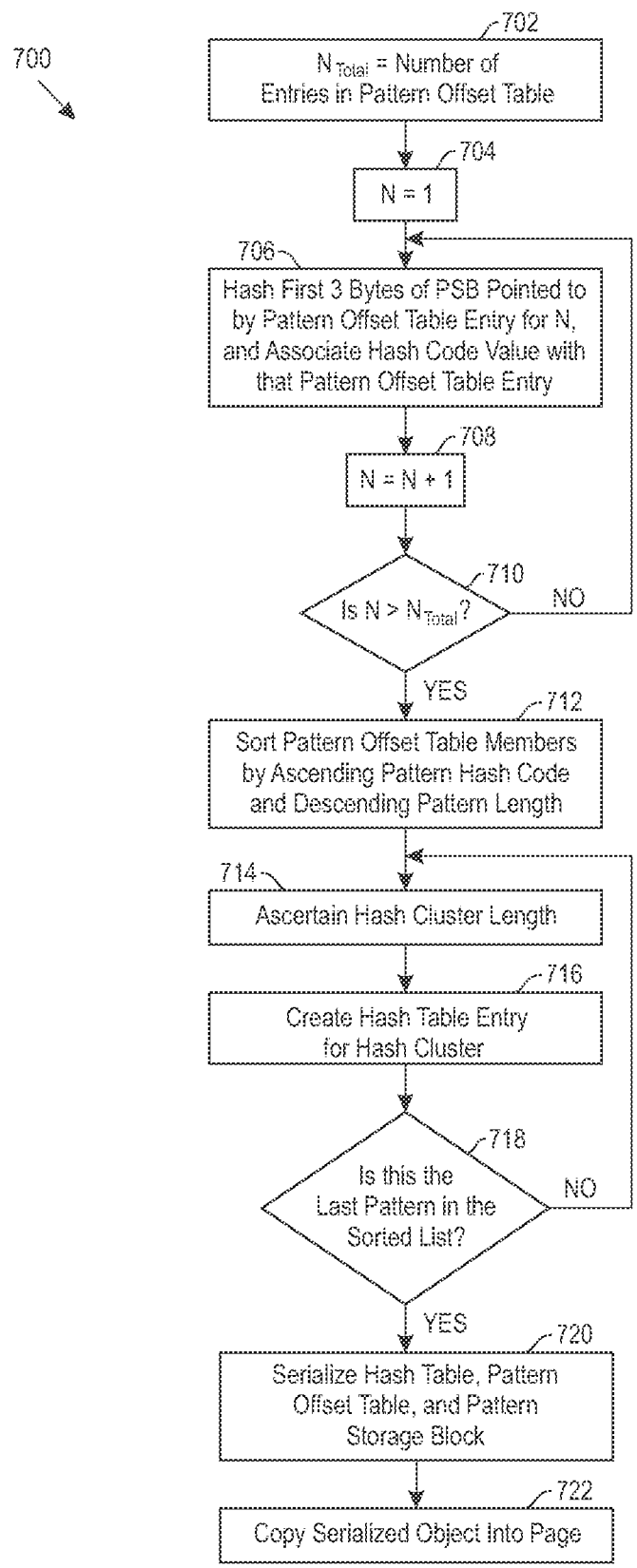
FIG. 7 is a flow chart illustrating a process for creating the hash table.

FIG. 3 is a flow chart (300) illustrating a process for construction of the dictionary. In one embodiment, the dictionary is employed at the page level with page content received as input. In the first step (302), input in the form of content to be compressed is received and candidate patterns are identified, i.e. patterns that may be considered for inclusion in the dictionary. Each candidate pattern ensures storage space savings will be achieved if it is replaced by a corresponding dictionary symbol for the number of times that the dictionary builder projected. In one embodiment, the dictionary builder may identify more candidate patterns than a dictionary can hold. The dictionary's member patterns, i.e. a candidate pattern that is selected for inclusion in the dictionary by the dictionary builder, are selected from the set of candidate patterns. Details of the identification process are shown in FIG. 4. Following step (302), the efficiency of each identified pattern is analyzed (304). Details of the analysis process are shown in FIG. 5. The third step includes selection of patterns for the dictionary from a set of candidate patterns (306). Details of the selection process are shown in the lower right portion of FIG. 5. The process of building the dictionary is entailed (308) based upon the pattern selection process. Details of the dictionary building process are shown in FIGS. 6 and 7.

Pattern detection is the process of identifying recurring patterns in a set of data, ranking them according to their potential for storage space savings, and selecting the most efficient of those patterns for inclusion in a dictionary. In order to identify recurring patterns, the pattern detection algorithm remembers previously-seen patterns and matches them against future patterns. The effectiveness of any compression scheme depends on whether or not a set of useful frequent patterns are found. FIG. 4 is a flow chart (400) illustrating a process for searching for patterns. In one embodiment, construction of a dictionary can be described for a single page. The input data is delimited in in-units (IUs). An IU can be any fixed number of bits. For illustrative purposes an IU may be a byte, but in one embodiment the IU is one half-byte, also referred to herein as a nibble. In one embodiment, the search for patterns is performed at three-byte increments, regardless of the IU size. As each page dictionary is created on a page-by-page basis, it is first determined if the search is at the end of the page (402). A positive response to the determination at step (402) concludes the process of search for patterns in the subject page. However, a negative response to the determination at step (402) is followed by hashing the first three bytes at the current position in the page, C, to an entry in the hash table (404). The process of hashing to the hash table includes looking for entries in that table that include one or more matches. Multiple patterns can have a match of the first three bytes. The set of all such patterns P matching the first three bytes will be searched for the "tightest fit" pattern, T, to the pattern starting at position C on the page, starting with the first pattern in that set (404). Accordingly, the hash table is a central tool in the process of efficiently searching for patterns in the source data.

Following step (404), it is determined if the process of examining the hash table did not yield a match of the subject first three bytes, or the process of examining the hash table entries is completed (406). A positive response to the determination at step (406) is an indication that either the subject first three bytes is a new pattern, or the matching process is completed. Conversely, a negative response to the determination at step (406) is followed by traversing the set of entries in the hash table that begin with the same three-byte pattern and looking for the longest matching such pattern that is also the "tightest fit" (steps 408-416). In one embodiment, the longest pattern matching is desirable, as it provides the greatest compression factor. If more than one pattern has the same longest matching, then the "tightest fit" among those patterns is used to break the tie. This "tightest fit" pattern is remembered as T as the set is traversed. Similarly, in one embodiment, the traversal of the set includes, for each candidate pattern P in the set, determining at step (408) the number, N, of IUs, starting at the current position C, that match the current candidate pattern, P. Following the determination of N at step (408), it is determined if the number of IUs that match the subject pattern is greater than or equal to the length of the current "tightest fit" pattern, T (410). A positive response to the determination at step (410) is followed by calculating the "tightness of fit" between the current input sequence beginning at C and the candidate pattern P (412). The "tightness of fit" is defined to be difference in length between the candidate pattern, P, and the matched length, N. If there are previously registered patterns in the set that have the same length or are longer than the longest match, then the "tightest fit" is the (most recently seen) shortest such pattern. If all previously registered patterns are shorter than the longest match, then the tightest fit is the (most recently seen) longest such pattern. Following step (412), it is determined in step (414) if the matched length N of the subject pattern P is longer than the remembered "tightest fit" pattern, T, or the same length as T but provides a tighter fit than T. A positive response to the determination at step (414) results in replacing the current "tightest fit" pattern, T, with the new "tightest fit" pattern, the current candidate pattern P (416) and proceeds to step (418). However, a negative response to the determination at step (414) bypasses step (416) and proceeds immediately to step (418). At step (418), it is determined whether the matched length N is at least as long as the length of the current candidate pattern, P, and that length of P is also greater than the longest prefix encountered in the set thus far (418). A positive response to the determination at step (418) results in remembering pattern P as the current longest prefix and its length (420). Following step (420) or a negative determination in step (418), the current pattern P is moved to the next pattern in the set having the same three-byte prefix (422), and returning to step (406).

A positive response to the determination at step (406) is followed by determining if the pattern being evaluated is the first entry or there is no match for the first three bytes of the pattern (424). Following a positive response to the determination at step (424), i.e. no match was found, the pattern being evaluated is recorded as a new pattern, with a frequency of occurrence thus far of 1 and no patterns that are prefixes of this pattern (426), and moving the cursor C of the source data over one IU in the source data page (428). Because it is not known where a pattern in the source data may start, each three-byte sequence to be examined will be offset by one IU. Following step (428), the process returns to step (402). Conversely, a negative response to the determination at step (424) is an indication that either the tightest fit pattern in the hash table traversal was found, or the subject source data is a new tightest fit pattern. The new pattern is recorded in the set, and its prefix is recorded as the same as that of the tightest fit pattern, T (430), after which it is determined if the new pattern is the same as the tightest fit pattern (432).

A negative response to the determination at step (432) is an indication that the subject pattern is a new pattern and includes updating the frequency of the new pattern, e.g. the prior pattern as a shorter element within the new pattern (434). The new pattern is placed in the hash table as a prefix to the tightest fit pattern (436), and the cursor C referencing the source data is moved forward by the length of the tightest fit pattern, T (440). Conversely, a positive response to the determination at step (432) is an indication that the subject pattern is a new occurrence of an old pattern and is followed by giving the new pattern the frequency of the tightest fit plus one (438) and moving the cursor C referencing the source data forward by the length of the tightest fit pattern, T (440). Following step (440) the process returns to step (402). It is important to note that a separate page dictionary will be constructed for each page, and each dictionary has its own hash table. More specifically, there is a different hash table for each page. Accordingly, the process of hashing a pattern includes searching for a match in a hash table of previously hashed values for a page of source data, as each page of the source data can have multiple patterns that repeat, or are prefixes thereof, and therefore match with a prior entry.

Once the patterns in the source data have been identified and reflected in the hash table, the efficiency of each identified pattern is analyzed. The dictionary building process analyzes all of the recorded patterns and builds the dictionary with the most efficient symbols, i.e. the symbols that generate the most storage savings with the largest number of bytes saved by replacing all pattern occurrences with the symbol. In one embodiment, the measure for pattern efficiency is the product of the pattern length and the number of recorded occurrences. For patterns with at least two occurrences, there is an efficiency threshold that ensures that the symbol will result in saving storage space. All patterns with efficiency greater than the threshold are considered for inclusion in the dictionary. More specifically, the efficiency threshold indicates that the break-even point at which a pattern starts generating space savings is crossed, assuming that all the pattern's occurrences will be replaced with a single-byte symbol. In one embodiment, each pattern in the dictionary that is used at least three times will generate space savings, and each pattern longer than four bytes that is used exactly twice will also save space. Patterns with an efficiency rating greater than the aforementioned threshold are considered candidate patterns for dictionary assembly. In one embodiment, the dictionary is limited to 256 patterns, including sixteen escape codes, thereby effectively being limited to 240 patterns. so the 240 most efficient patterns will become the member patterns of the dictionary. Similarly, in one embodiment, if the total number of candidate patterns is 240 or less, then all of the candidates will be included in the dictionary. Accordingly, patterns are sorted by length in descending order to bring the patterns into an efficient order to allow for shared prefix storage.

FIG. 5 is a flow chart (500) illustrating a process for analyzing this efficiency, and based upon this analysis, a selection of members for the dictionary. In one embodiment, the analysis includes determining whether there are too many entries in the hash table or not enough entries. An array of patterns in the hash table is received as input, and the first pattern in the hash table is selected for analysis (502). It is then determined if the selected pattern is the last pattern in the hash table (504). A negative response to the determination at step (504) is followed by determining if the subject pattern is efficient (506). In one embodiment, the efficiency test may include determining if a product of the length of the subject pattern and the quantity of occurrences of the subject pattern is greater than twenty-six nibbles. However, other tests of efficiency may be employed and the scope of the invention should not be limited to this exemplary test. A positive response to the determination at step (506) is followed by adding the subject patterns as a candidate for the dictionary (508). However, a negative response to the determination at step (506) is an indication that the subject pattern has not been selected as a dictionary candidate. Following either step (508) or a negative response to the determination at step (506), the next pattern in the hash table is selected (510) and the process returns to step (504). Accordingly, the first part of the analysis process includes analyzing the efficiency of each pattern identified in the hash table.

The second part of the analysis process includes selecting members for the dictionary from the efficient candidate patterns. It is determined if the quantity of candidate patterns exceeds the limit of 240 patterns (512). A negative response to the determination at step (512) is followed by ordering the candidate patterns (514). In one embodiment, the candidate patterns are selected on efficiency and sorted based on length. Conversely, a positive response to the determination at step (512) is followed by ordering the candidate patterns by decreasing efficiency (516) and selecting the top 240 candidate patterns starting with the most efficient (518), followed by ordering the candidate patterns (514). Accordingly, the candidate selection process concludes with a selection based on efficiency and a sort based on length of patterns.

Following the pattern selection process shown in FIG. 5, the dictionary member patterns have been identified and the final dictionary structure is built. There are three stages to the building process. The first stage includes building the pattern storage block, in which pattern descriptors are generated for all of the dictionary member patterns. The second stage includes the building of the pattern offset table with all of the pattern descriptors in their proper order. The third and final stage includes construction of the hash table to be used for efficiently locating pattern descriptors.

FIG. 6 is a flow chart (600) illustrating a process for building the pattern storage block, including generating pattern descriptors for all of the dictionary member patterns that were selected and ordered as shown in FIG. 5. The pattern storage block sequentially stores patterns of a page dictionary. Initially, the pattern storage block is empty (602), and the first member of the dictionary is selected for entry into the pattern storage block (604). In one embodiment, the patterns are selected in order starting with the longest pattern. Following step (604), it is determined if the selected dictionary member is the last entry in the sorted list (606). A positive response to the determination at step (606) concludes the process (608) of building the pattern storage block and its corresponding pattern offset table entries. Conversely, a negative response to the determination at step (606) is followed by determining if the prefix mark is set to "on" for the pattern under consideration (610). It should be noted that the prefix mark is not set for the first pattern under consideration. So, if the pattern being evaluated is the first pattern under consideration for the subject page, then a negative response to the determination at step (610) is followed by adding the pattern to the end of the pattern storage block and noting where the pattern ends (612). At the same time, the next pattern, R, is obtained from the prefix chain (614).

Following step (614), it is determined if there is a next pattern, R, in the prefix chain for the subject pattern (616). A positive response to the determination step (616) is followed by remembering the location of the next pattern, R, as the location of the pattern prefix (618) and returning to step (614). However, a negative response to the determination at step (616) or a positive response to the determination at step (610) is followed by building a pattern descriptor for the dictionary member, including remembering the location of the pattern and its length, and adding the pattern descriptor to the end of the pattern offset table (620). Following step (620), the next dictionary member is selected for evaluation (622) followed by a return to step (606).

As shown in FIG. 6, if a pattern is a prefix of another pattern, then the other patterns may already be a member of the pattern storage block. The assembly algorithm, as shown, tracks which patterns are already processed and detect whether or not the matching pattern is in the pattern storage block. In the case where the matching pattern is in the pattern storage block, the pattern descriptor for the subject pattern will point to the physical location of the pattern in the pattern storage block, thereby avoiding redundant storage of patterns that are prefixes of other patterns. Accordingly, the steps described herein show the process of assembling the pattern storage block and pattern offset table.

Following completion of FIG. 6, the hash table to be used for data compression is constructed. More specifically, FIG. 7 is a flow chart (700) illustrating a process for creating the hash table. The number of entries in the pattern offset table is known, and this quantity is assigned to the variable $N_{Total}$ (702), and an associated counting variable, N, is assigned to the integer one (704). The first three bytes of the pattern storage block entry$_N$ as pointed to by the pattern offset table is hashed, and the hash value is associated with the entry$_N$ (706). Following the hashing process, the counting variable N is incremented (708), and it is determined if all of the pattern storage block entries have been hashed (710). A negative response to the determination at step (710) is followed by a return to step (706). Conversely, a positive response to the determination at step (710) concludes the hashing process. The members of the pattern offset table block are then sorted in ascending order by hash code and in descending pattern length (712). A group of patterns with the same hash code are referred to as a hash cluster. See FIG. 2. For each hash cluster, the length of the hash cluster is ascertained (714) and a hash table entry for the hash cluster is created (716). Following creation of a hash table index, it is determined if the current pattern being evaluated is the last pattern in the sorted list (718). A negative response to the determination at step (718) is followed by a return to step (714). Conversely, a positive response to the determination at step (718) is followed by serializing the hash table, the pattern offset table, and the pattern storage block (720), and copying the serialized objects into the page (722). More specifically, at step (722), the hash table, the pattern offset table, and the pattern storage block which reside in non-consecutive memory have to be copied out to their final consecutive location in the page and any memory-location pointers in those structures must be made relative to the starting point of the serialization.

Following step (722), the three dictionary building blocks are complete, and the dictionary may be used for compression. In one embodiment, the dictionary structure is designed to be accessed and used directly in buffer pool memory, i.e. without the need to de-serialize and copy out before using. Both the dictionary hash table and the pattern storage block are byte-oriented structures and can be accessed directly. In one embodiment, the pattern offset table consists of 24-bit values, each containing an 8-bit integer pattern length and a 16-bit integer starting offset in the pattern storage array, which are in-line functions that must be used to access the pattern offset table and extract the length and offset of each entry in this table.

Figure 8:
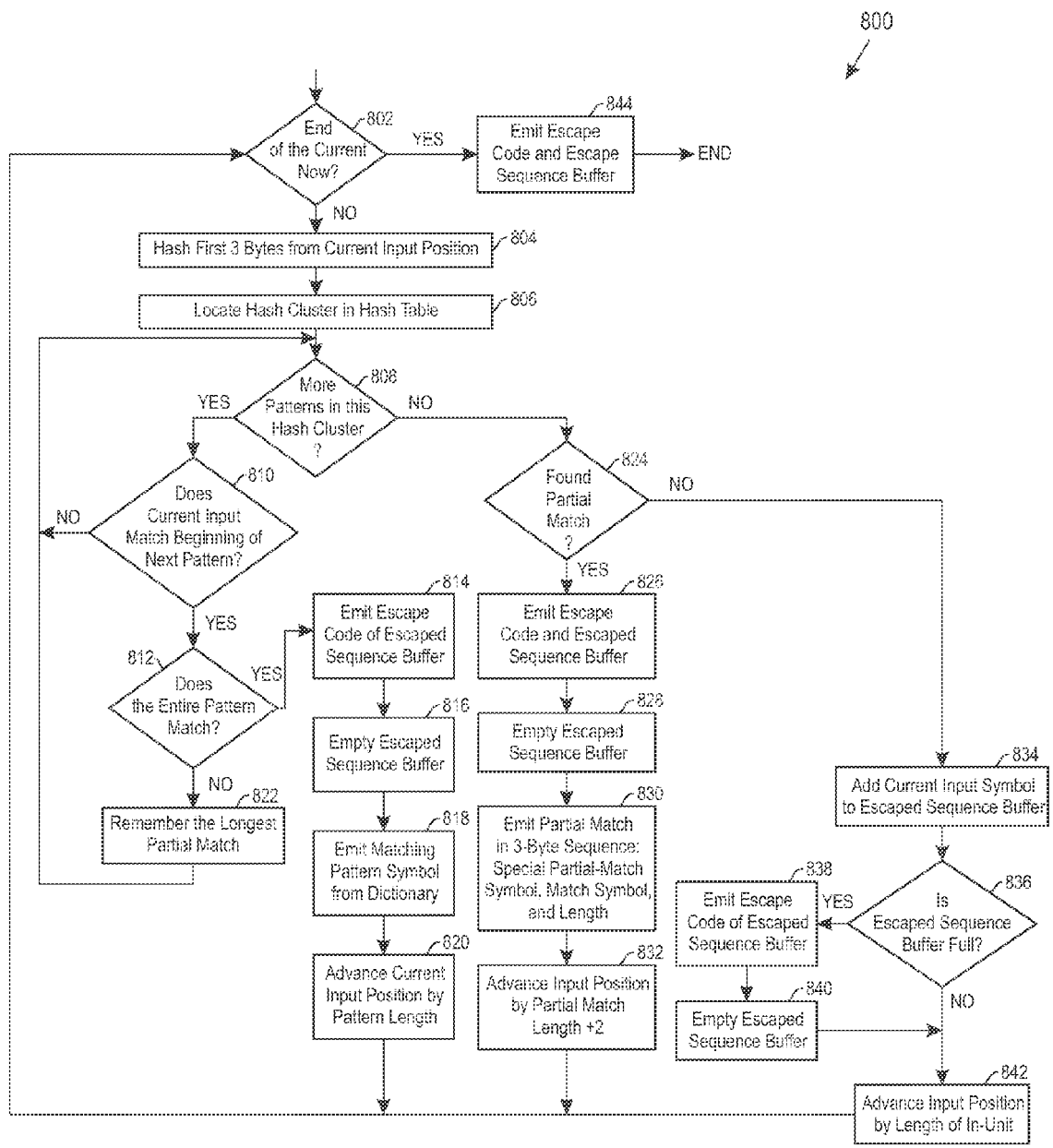
FIG. 8 is a compression algorithm for matching sub-patterns in input data with member patterns in the dictionary.

The constructed page dictionary may be used to compress and decompress records. FIG. 8 is a flow chart (800) illustrating a compression algorithm for matching sub-patterns in input data with member patterns in the dictionary. The compression algorithm takes a row as input and produces the compressed representation of that row as output, for each row in the page. Compression starts analyzing the record from the beginning and moves the current input position through the row until the end of the row is reached. Parts of the row for which a matching pattern is not found in the dictionary are temporarily buffered in an escaped sequence buffer, whose contents will be emitted whenever the buffer becomes full, the end of the row is reached, or a matching pattern is found. Prior to compressing the data, it is first determined if the end of the current row has been reached (802). In response to a negative determination at step (802), the compression algorithm hashes the first three bytes of the current input position to generate a hash code (804), which is used to locate the beginning of the hash cluster in the pattern offset table that contains all potentially matching member patterns in the dictionary (806). It is then determined if there are more patterns in the cluster (808), and if so, if the current input matches the beginning of the next pattern (810). A positive response to the determination at step (810) is followed by determining if the input starting at the current input position matches the pattern in its entirety (812). A positive response to the determination at step (812) is followed by: emitting the appropriate escape symbol (based upon the length of the contents of the escaped sequence buffer) followed by the current contents of the escaped sequence buffer if it is not empty (814), emptying the escaped sequence buffer (816), emitting the matching pattern symbol found in the dictionary (818), advancing the current input position of the row being compressed by the pattern length (820), all followed by a return to step (802). However, a negative response to the determination at step (812), meaning there is only a partial match, is followed by remembering the longest partial match (822). Following a negative response to the determination at step (810) or following step (822), the process returns to step (808) to consider the next pattern in the hash cluster. Accordingly, for each pattern in the cluster, it is determined if there is a partial or complete match, with a symbol emitted for each matching pattern or escape sequence.

Following a negative response to the determination at step (808), it is determined if a partial match has been ascertained (824). A positive response to the determination at step (824) is followed by emitting the escape symbol, followed by the current contents of the escaped sequence buffer if it is not empty (826), and emptying the escaped sequence buffer (828). This is followed by emitting the special partial-match, three-byte sequence (830) which is composed of the special partial-match symbol (one byte), the symbol of the pattern that is partially matched (one byte), and the length of the partial match (one byte) followed by advancing the current input position of the row being compressed by the partial-match length (832), and a return to step (802). Conversely, a negative response to the determination at step (824), meaning no match for the input sequence was found in the dictionary, is followed by adding the current input symbol to the escaped sequence buffer (834), followed by a determination if the escaped sequence buffer is full (836). A positive response to the determination of step (836) is followed by emitting the appropriate escape symbol and escaped sequence buffer contents (838), emptying the escaped sequence buffer (840), advancing the input position of the row being compressed by the length of an in-unit (842), and returning to step (802). A negative response to the determination of step (836) bypasses steps (838) and (840), instead continuing directly to step (842) and then returning to step (802). Once the end of the current row has been reached (a positive response to determination step (802)), the compression process emits the escape symbol for the appropriate length of remaining escaped data in the escaped sequence buffer, followed by the contents of the escaped sequence buffer (844), and concludes the compression process for this row.

As shown in FIG. 8, the compression algorithm hashes the first three bytes of the current input position to generate a hash code, which is used to look up the hash table and to obtain the hash cluster information. Then the algorithm tries to match the patterns in the hash cluster, and emits the symbol code if there is a match. Before emitting the symbol code, if there is a sequence of escaped (unmatchable) values before the current matching, an escape symbol and the escaped sequence are emitted. Since before this matching the escaped length is unknown, the process waits for a pattern matching or the end of the current row to determine the length and the proper escape symbol. The order of the pattern descriptors within each hash cluster is according to length of the associated byte pattern in descending order. This ensures that the longest possible match at the current position is found, i.e. the matching process may stop matching the remaining patterns in the cluster when the first matching pattern is found. In one embodiment, the compressed row produced by the compression algorithm shown in FIG. 8 is strictly a sequence of 8-bit values. It contains dictionary symbols which are 8-bit values, along with escape sequences which are treated as byte sequences. If the input IUs are not byte aligned, the compression algorithm aligns the escaped in-units to begin on a full byte boundary.

For each compressed record, a decompression process may be employed to restore the original row from the compressed representation by replacing dictionary symbols with their associated byte patterns and copying escape sequences from the compressed representation. The compressed data resulting from the compression mechanisms described above can be subsequently decompressed to return the original data using the same dictionary as was used to compress it. Each symbol in the compressed data represents either an entry in the dictionary containing its corresponding unencoded sequence of half-bytes from the original data, or the length of an escaped (i.e., unencoded) sequence which follows that symbol. If the symbol represents a dictionary entry, the corresponding dictionary entry can be directly addressed in the pattern offset table of the dictionary using the symbol as an index, its corresponding original sequence of half-bytes is returned from the pattern storage block, and the cursor on the compressed data is advanced by one byte for the dictionary symbol just processed. If, on the other hand, the symbol is an escape symbol, the length of the escape sequence is determined from the symbol, that many half-bytes following that escape symbol are returned, and the cursor on the compressed data is advanced by that length plus one byte for the escape symbol itself.

Figure 9:
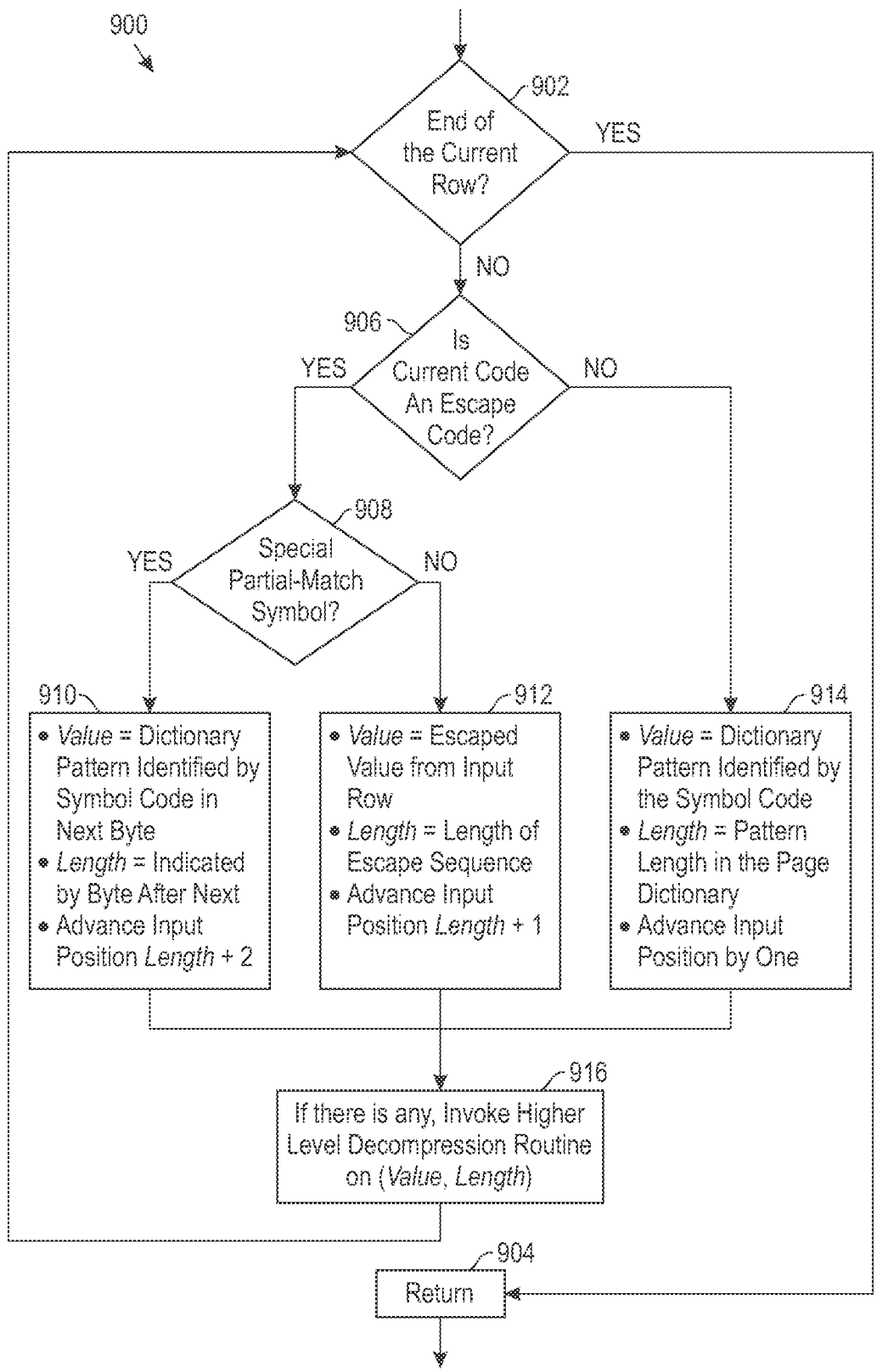
FIG. 9 is a flow chart illustrating a decompression algorithm.

FIG. 9 is a flow chart (900) illustrating the decompression process as described briefly in FIG. 8 above. The decompression algorithm takes a compressed row representation as input, and starts analyzing the row from the beginning, and moves the current input position through the row until the end of the row is reached. First it is determined if the end of the row has been reached (902). A positive response to the determination at step (902) concludes the decompression process (904). However, a negative response to the determination at step (902) is followed by determining if the code at the current position in the row is an escape code (906). If the current code is not an escape code, then the dictionary symbol has a corresponding byte pattern. The dictionary pattern is identified by the symbol code and assigned to the variable value, the pattern length in the page dictionary is assigned to the variable length, and the cursor is advanced one position within the input (914).

Some of the codes extracted from the compressed row representation may be in the form of an escape code. A positive response to the determination at step (906) is followed by a subsequent determination to ascertain if the current code is a special partial-match symbol (908). If the response to the determination at step (908) is negative, the escape value from the input row is assigned to the variable value, the length of the escape sequence is assigned to the variable length, and the cursor is advanced the length of the escape sequence plus one character position within the input (912). Finally, a positive response to the determination at step (908) is followed by assigning the dictionary pattern identified by the symbol code in the next byte to the variable value, assigning the variable length to be the partial-match length in the third byte, and advancing the cursor in the input row by the value of the variable length plus two character positions (910). Following any of steps (910), (912), or (914), if the output alphabet is encoded by a higher-level compression algorithm, then the decompression is invoked on the next bytes following the escape code, the output produced from the higher-level decompression is appended at the current output position, and the current output position is then advanced by the length of the decompressed bytes (916). Following step (916), the process returns to step (902). Upon reaching the end of the row, the decompression process is completed. Accordingly, the decompression algorithm takes a compressed row representation as input and produces an expanded representation as output, which is placed in a different output buffer.

Figure 10:
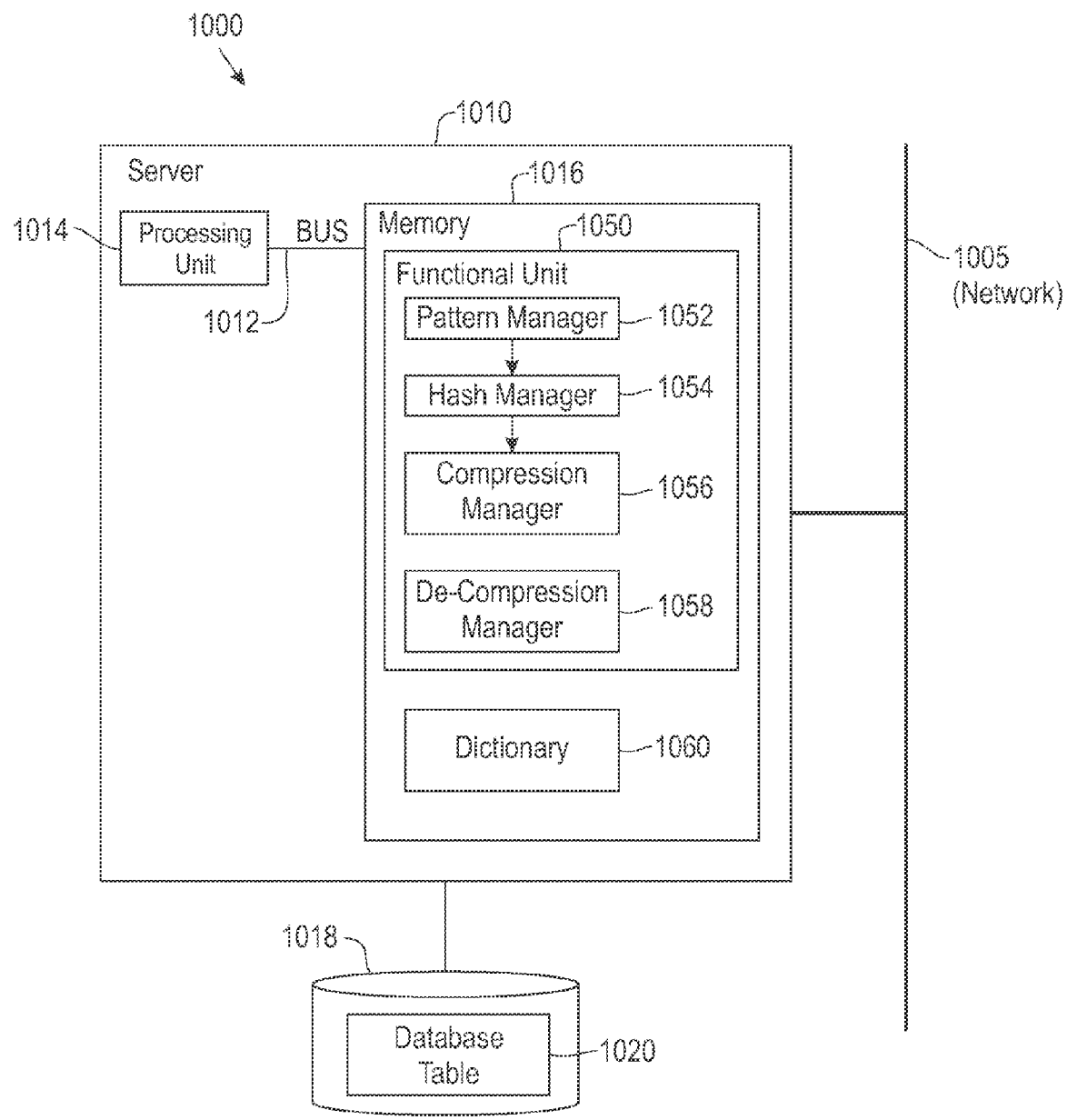
FIG. 10 is block diagram illustrating tools embedded in a computer system to support creation of the page dictionary, as well as compression and de-compression of records with use of the created dictionary.

As demonstrated in the flow charts of FIGS. 1-7, a method is employed for dictionary creation. In the flow chart of FIGS. 8 and 9, the created dictionary is employed to compress and decompress records, and so will be referred to hereafter as just the dictionary. FIG. 10 is a block diagram (1000) illustrating tools embedded in a computer system to support creation of the page dictionary for a row in a database table, as well as compression and de-compression of records using the created dictionary. As shown, a server (1010) is provided with a processing unit (1014) in communication with memory (1016) across a bus (1012), and in communication with data storage (1018). In one embodiment, the server (1010) may communicate with remote data storage (not shown) across a network connection (1005). The data storage (1018) is shown with a database table (1020), which in one embodiment may contain a plurality of rows.

Prior to compressing source data from the database table (1020), the dictionary must be formed. A functional unit (1050) is provided in communication with the storage component (1018). The functional unit (1050) is provided with a pattern manager (1052) and a hash manager (1054) to support creation of the dictionary. The constructed dictionary (1060) both organizes and stores the identified frequent patterns found in the computer-identified (1020). In one embodiment, the dictionary (1060) is stored in memory (1016) in communication with the functional unit (1050). Similarly, although there is only one dictionary (1050) shown, there may be a plurality of compression dictionaries created and stored, as in one embodiment the dictionary may be separate for each page in which the corresponding database table (1020) is stored. In addition, the functional unit (1050) includes a compression manager (1056) to compress source data with the support of the created dictionary(s) (1060) and a de-compression manager (1058) is provided to de-compress the source data compressed by the compression manager (1056).

The pattern manager (1052) is provided for creation of the dictionary structure. More specifically, in one embodiment, the pattern manager (1052) sequentially stores each identified pattern in a pattern storage block, records both the offset and length data for each stored pattern in a pattern offset table, forms hash clusters, places the patterns in a specific order, and constructs a hash table indexing each hash cluster. The pattern manager (1052) assigns a separate symbol value to each pattern in each hash cluster, wherein a hash cluster is defined as a group of patterns with the same hash code. Symbols are assigned to patterns in increasing order by hash code, and within each hash cluster (hash code), by decreasing pattern length. Each escape code for a different length of the input data that is not in the dictionary, is pre-assigned an entry in the dictionary.

As noted above, the functional unit (1050) is provided with a compression manager (1056) in communication with the pattern manager (1052) and the hash manager (1054). The compression manager (1056) functions to compress source data (1020) using the created dictionary (1060). More specifically, the compression manager (1056) is in communication with the hash manager (1054) which hashes an initial quantity of bytes of an input pattern of the source data. The hash manager (1054), with use of the constructed hash table, searches for a match of the hashed bytes with at least one entry in the hash table. In one embodiment, the hash manager (1054) functions to identify groups of patterns that have similar prefixes. The hash manager (1054) returns either the longest matching pattern in the hash cluster or an escape code for a length of an escaped sequence, which in one embodiment may be in the form of half-bytes.

In addition to compressing data, the same dictionary (1060) may be used to de-compress the set of encoded data compressed by the compression manager (1056). More specifically, a de-compression manager (1058) is provided to de-compress the compressed source data. The de-compression manager (1058) evaluates a character at a starting position of the source (compressed) data. If the evaluated character is an escape code, the byte sequence from the source data of the length indicated by that escape-code character is returned. Alternatively, if the character evaluated by the de-compression manager (1058) is a symbol, the de-compression manager (1058) returns the corresponding pattern from the dictionary (1060) for that symbol. Accordingly, the same compact pattern storage element, i.e. the dictionary (1060), is used for both compression and decompression.

As shown herein, the functional unit (1050) is provided local to the system (1010). However, in one embodiment, the functional unit (1050) may be in communication with the server (1010) across the network (1005). Similarly, the pattern manager (1052), compression manager (1054), hash manager (1056), and de-compression manager (1058) are provided local to the server (1010) to support both compression and de-compression of source data (1020) with a same dictionary. More specifically, the pattern manager (1052), hash manager (1054), compression manager (1056), and de-compression manager (1058) function as elements to support the creation of the dictionary structure, as well as the compression and de-compression of source data with use of the same created dictionary structure. The managers (1052)-(1058) are shown residing in memory (1016) local to the server (1010). However, the managers and director (1052)-(1058) may reside as hardware tools external to memory (1016), or they may be implemented as a combination of hardware and software. Similarly, in one embodiment, the managers and director (1052)-(1058) may be combined into a single functional item that incorporates the functionality of the separate items. In one embodiment, a benefit associated with combining the managers and director into a single functional unit, includes but is not limited to, empowering data compression and de-compression efficiencies. As shown herein, each of the managers (1052)-(1058) are shown local to the server (1010). However, in one embodiment they may be collectively or individually distributed across the network (1005) and function as a unit to manage creation of the dictionary to support compression and de-compression of source data with the same dictionary. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
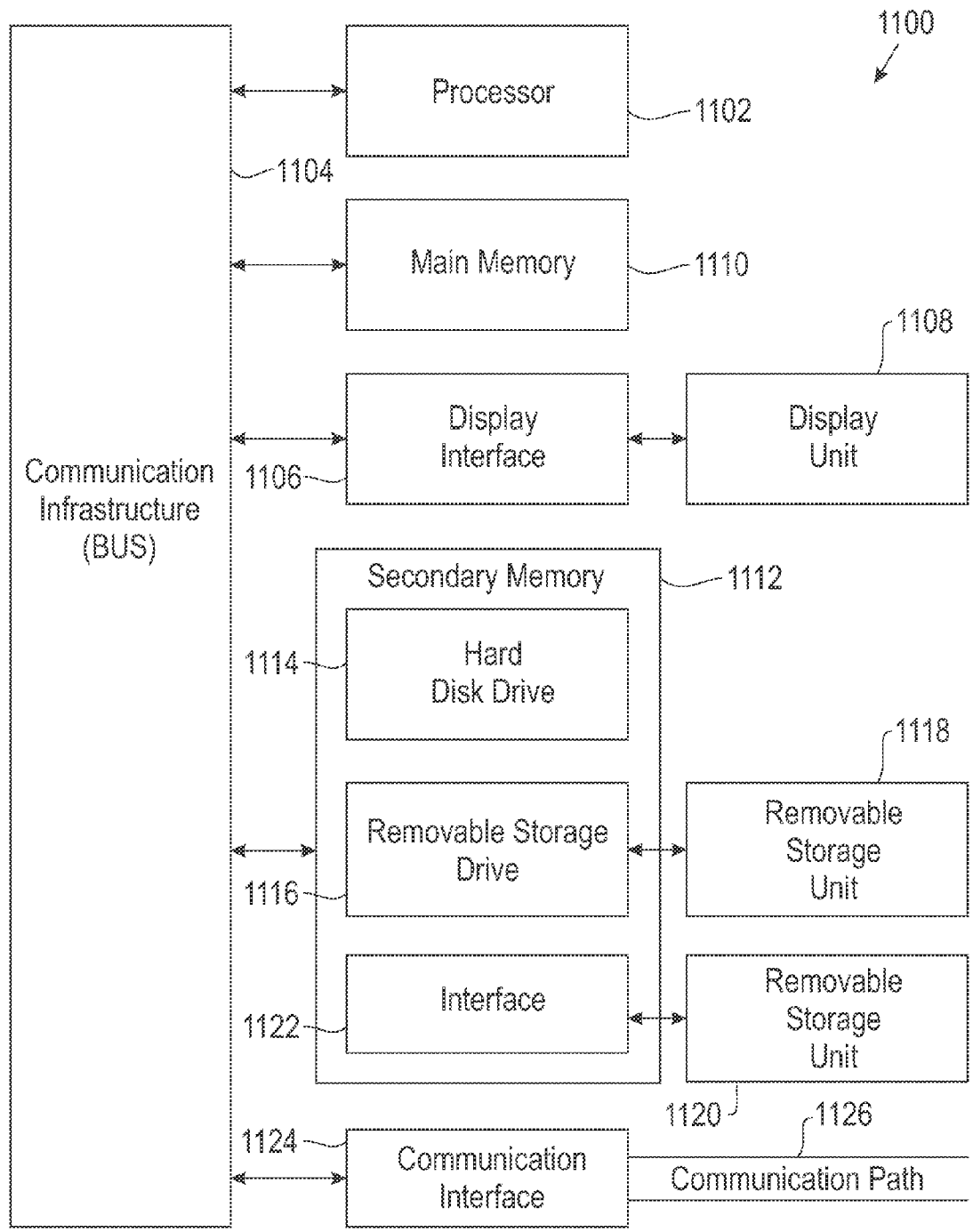
FIG. 11 is a block diagram showing a system for implementing an embodiment of the present invention.

Referring now to the block diagram of FIG. 11, additional details are now described with respect to implementing an embodiment of the present invention. The computer system includes one or more processors, such as a processor (1102). The processor (1102) is connected to a communication infrastructure (1104) (e.g., a communications bus, cross-over bar, or network).

The computer system can include a display interface (11010) that forwards graphics, text, and other data from the communication infrastructure (1104) (or from a frame buffer not shown) for display on a display unit (1108). The computer system also includes a main memory (1110), preferably random access memory (RAM), and may also include a secondary memory (1112). The secondary memory (1112) may include, for example, a hard disk drive (1114) and/or a removable storage drive (1116), representing, for example, a floppy disk drive, a magnetic tape drive, or an optical disk drive. The removable storage drive (1116) reads from and/or writes to a removable storage unit (1118) in a manner well known to those having ordinary skill in the art. Removable storage unit (1118) represents, for example, a floppy disk, a compact disc, a magnetic tape, or an optical disk, etc., which is read by and written to by removable storage drive (1116). As will be appreciated, the removable storage unit (1118) includes a computer-readable medium having stored therein computer software and/or data.

In alternative embodiments, the secondary memory (1112) may include other similar means for allowing computer programs or other instructions to be loaded into the computer system. Such means may include, for example, a removable storage unit (1120) and an interface (1122). Examples of such means may include a program package and package interface (such as that found in video game devices), a removable memory chip (such as an EPROM, or PROM) and associated socket, and other removable storage units (1120) and interfaces (1122) which allow software and data to be transferred from the removable storage unit (1120) to the computer system.

The computer system may also include a communications interface (1124). Communications interface (1124) allows software and data to be transferred between the computer system and external devices. Examples of communications interface (1124) may include a modem, a network interface (such as an Ethernet card), a communications port, or a PCM-CIA slot and card, etc. Software and data transferred via communications interface (1124) are in the form of signals which may be, for example, electronic, electromagnetic, optical, or other signals capable of being received by communications interface (1124). These signals are provided to communications interface (1124) via a communications path (i.e., channel) (1126). This communications path (1126) carries signals and may be implemented using wire or cable, fiber optics, a phone line, a cellular phone link, a radio frequency (RF) link, and/or other communication channels.

In this document, the terms "computer program medium," "computer usable medium," and "computer-readable medium" are used to generally refer to media such as main memory (1110) and secondary memory (1112), removable storage drive (1116), and a hard disk installed in hard disk drive (1114).

Computer programs (also called computer control logic) are stored in main memory (1110) and/or secondary memory (1112). Computer programs may also be received via a communication interface (1124). Such computer programs, when run, enable the computer system to perform the features of the present invention as discussed herein. In particular, the computer programs, when run, enable the processor (1102) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the page-level compression may be utilized with table-level compression and adapted to newly-inserted data having widely differing distributions. Accordingly, the scope of protection of this invention is limited only by the following claims and their equivalents.

We claim:

1. A method comprising:
   identifying a first set of reoccurring data values in a file at a table level;
   constructing a first data structure to organize and store the first set of identified reoccurring values in the file;
   compressing the file using the first data structure for encoding data within the file;
   dividing the compressed file into a plurality of segments, wherein the segment is a physical page within the file and the reoccurring values are drawn from the page;
   for each segment, identifying a second set of reoccurring data values of compressed data within the compressed file at a page level;
   constructing a second data structure to organize and store the identified second set of reoccurring compressed data values in each segment; and
   individually compressing the segments using the second data structure for encoding data within each segment.

2. The method of claim 1, wherein the file being compressed is a table in a relational database.

3. A computer implemented method comprising:
   identifying reoccurring data patterns in a set of source data;
   constructing a first dictionary at a first database level to organize and store the identified reoccurring patterns in the source data, including:
      sequentially storing each identified pattern in a pattern storage block;
      recording offset and length data for each stored pattern in a pattern offset table;
      forming hash clusters comprised of one or more patterns with a matching hash value, wherein the matching hash value represents an initial quantity of bytes that hash to a common pattern length;
      placing the patterns within each hash cluster in an order based upon criteria; and
      constructing a hash table, including an entry for each hash cluster;
   compressing the source data using the dictionary, including:
      hashing an initial quantity of bytes of an input pattern of the source data, and
   employing the constructed hash table to index into a first entry in the hash cluster;
      returning a dictionary symbol selected from the group consisting of: a longest matching pattern in the hash cluster and an escape code for a length of an escaped sequence; and
   constructing a second dictionary at a second database level, wherein the second dictionary nests within the first dictionary.

4. The method of claim 3, further comprising assigning a symbol value to each pattern in a hash cluster, wherein symbol values are assigned in decreasing order of pattern length, and an entry in the hash table for the hash cluster is a first assigned symbol in the hash cluster.

5. The method of claim 3, wherein the step of identifying reoccurring data patterns in a set of source data is not limited to byte boundaries.

6. The method of claim 3, further comprising assigning an escape code for a length of an associated sequence of bits absent from the dictionary and returning the escape code and associated original sequence of bits.

7. The method of claim 3, further comprising decompressing the set of source data with the constructed dictionary, including:
   evaluating a character at a starting input position of the source data, and
      if the evaluated character is an escape code, returning the associated sequence of bits from the source data, and
      if the evaluated character is a symbol in the dictionary, replacing the symbol with the corresponding pattern stored in the pattern storage block of the dictionary.

8. The method of claim 3, wherein the step of returning a dictionary symbol includes a partial match, the partial match including a partial match escape code, a second dictionary symbol for a matching pattern, and length of the partial match.

9. A computer program product for use with data compression, the computer program product comprising a computer-readable storage device having computer-readable program code embodied thereon, which when executed causes a computer to implement the method comprising:
   identifying reoccurring data patterns in a set of source data;
   constructing a first dictionary at a first database level to
      organize and store the identified reoccurring patterns in the source data, including:
         sequentially storing each identified pattern in a pattern storage block;
         recording offset and length data for each stored pattern in a pattern offset table;
         forming hash clusters comprised of one or more patterns with a matching hash value, wherein the matching hash value represents an initial quantity of bytes that hash to a common pattern length;
         placing the patterns within each hash cluster in an order based upon criteria;
         constructing a hash table, including an entry for each hash cluster;
   compressing the source data using the dictionary, including:
      hashing an initial quantity of bytes of an input pattern of the source data, and employing the constructed hash table to index into a first entry in the hash cluster,
      returning a dictionary symbol selected from the group consisting of: a longest matching pattern in the hash cluster and an escape code for a length of an escaped sequence; and
   constructing a second dictionary at a second database level, wherein the second dictionary nests within the first dictionary.

10. The computer program product of claim 9, further comprising assigning a symbol value to each pattern in a hash cluster, wherein symbol values are assigned in decreasing order of pattern length, and an entry in the hash table for the hash cluster is a first assigned symbol in the hash cluster.

11. The computer program product of claim 9, wherein the instructions to identify reoccurring data patterns in a set of source data is not limited to byte boundaries.

12. The computer program product of claim 9, further comprising assigning an escape code for a length of an associated sequence of bits absent from the hash table and storing the escape code and associated sequence of bits as an entry in the first data structure.

13. The computer program product of claim 9, further comprising decompressing the set of source data with the constructed first data structure, including:
   evaluating a character at a starting input position of the source data, and
   if the evaluated character is an escape code, returning the associated sequence of bits from a compressed representation in the first data structure, and
   if the evaluated character is a symbol in the dictionary, replacing the symbol with a corresponding sequence of bits.

14. The computer program product of claim 9, wherein the instructions to return a dictionary symbol includes a partial match, the partial match including a partial match escape code, a second dictionary symbol for a matching pattern, and length of the partial match.

15. A computer system comprising:
   a server with a processing unit in communication with memory;
   a storage component that includes source data;
   a functional unit in communication with the storage component, the functional unit in communication with the processing unit, the processing unit to identify reoccurring data patterns in a set of source data, and to construct a first dictionary at a first database level to organize and store the identified reoccurring patterns in the source data, the functional unit comprising:
      a pattern manager to sequentially store each identified pattern in a pattern storage block, to record offset and length data for each stored pattern in a pattern offset table, to form hash clusters comprised of one or more patterns with a matching hash value, wherein the matching hash value represents an initial quantity of bytes that hash to a common pattern length, to place the patterns within each hash cluster in an order based upon criteria, and to construct a hash table, including an entry for each identified hash cluster;
      a compression manager in communication with the pattern manager, the compression manager to compress the source data using the dictionary, including:
         a hash manager in communication with the compression manager, the hash manager to hash an initial quantity of bytes of an input pattern of the source data, and employing the constructed hash table to index into a first entry in the hash cluster, and
         the hash manager to return a dictionary symbol selected from the group consisting of: a longest matching pattern in the hash cluster and an escape code for a length of an escaped sequence; and
      the functional unit to construct a second dictionary at a second database level, wherein the second dictionary nests within the first dictionary.

16. The system of claim 15, further comprising the pattern manager to assign a symbol value to each pattern in a hash cluster, wherein symbol values within the hash cluster are assigned in decreasing order of pattern length, and an entry in the hash table for the hash cluster is a first assigned symbol in the hash cluster.

17. The system of claim 15, wherein the functional unit identification of reoccurring data patterns in a set of source data is not limited to byte boundaries.

18. The system of claim 15, further comprising the pattern manager to assign an escape code for a length of an associated sequence of bits absent from the hash table and storing the escape code and associated sequence of bits as an entry in the dictionary.

19. The system of claim 15, further comprising a decompression manager to decompress the set of source data with the constructed dictionary, including:
   evaluating a character at a starting input position of the source data, and
   if the evaluated character is an escape code, returning an associated sequence of bits from a compressed representation in the dictionary, and
   if the evaluated character is a symbol in the dictionary, replacing the symbol with a corresponding sequence of bits.

20. The system of claim 15, wherein the hash manager to return a dictionary symbol includes a partial match, the partial match to include a partial match escape code, a second dictionary symbol for a matching pattern, and length of the partial match.

* * * * *